United States Patent [19]
Nitsch

[11] 4,179,592
[45] Dec. 18, 1979

[54] SIGNAL SWITCH ASSEMBLY
[75] Inventor: Edward J. Nitsch, Camillus, N.Y.
[73] Assignee: R. E. Dietz Co., Syracuse, N.Y.
[21] Appl. No.: 862,864
[22] Filed: Dec. 21, 1977
[51] Int. Cl.² .......................... H01H 3/16; B60Q 1/46
[52] U.S. Cl. .............................. 200/61.27; 200/61.54; 340/81 F
[58] Field of Search ..................... 200/4, 61.27, 61.54, 200/61.3, 61,31, 61,34; 340/73, 76, 81 R, 81 F

[56] References Cited
U.S. PATENT DOCUMENTS

| | | | |
|---|---|---|---|
| 2,667,627 | 6/1954 | Hollins | 200/61.27 X |
| 2,717,331 | 9/1955 | Hollins | 200/61.27 X |
| 3,337,846 | 8/1967 | Hollins | 200/61.27 X |
| 3,591,740 | 7/1971 | Kolster | 340/81 F X |
| 3,858,176 | 12/1974 | Miller et al. | 200/61.27 X |
| 3,940,579 | 2/1976 | Buhl et al. | 200/4 |

FOREIGN PATENT DOCUMENTS 1001613  1/1957  Fed. Rep. of Germany .............. 200/4

Primary Examiner—James R. Scott
Attorney, Agent, or Firm—Bruns & Jenney

[57] ABSTRACT

A multifunction signal switch assembly suited for use in heavy duty trucks or the like requiring a rugged installation which can be readily dismantled and reassembled for convenient maintenance. The switch mechanism includes easily replaceable plug-in contact modules and a simple pilot light arrangement which renders the apparatus compatible with most standard two or three terminal flasher systems typicall used in the industry. The apparatus, in addition to the conventional turn signal and hazard warning functions, also supplies an additional function that can be wired, atthe user's option, into any number of automotive related circuits such as a headlight dimming circuit or the like.

13 Claims, 9 Drawing Figures

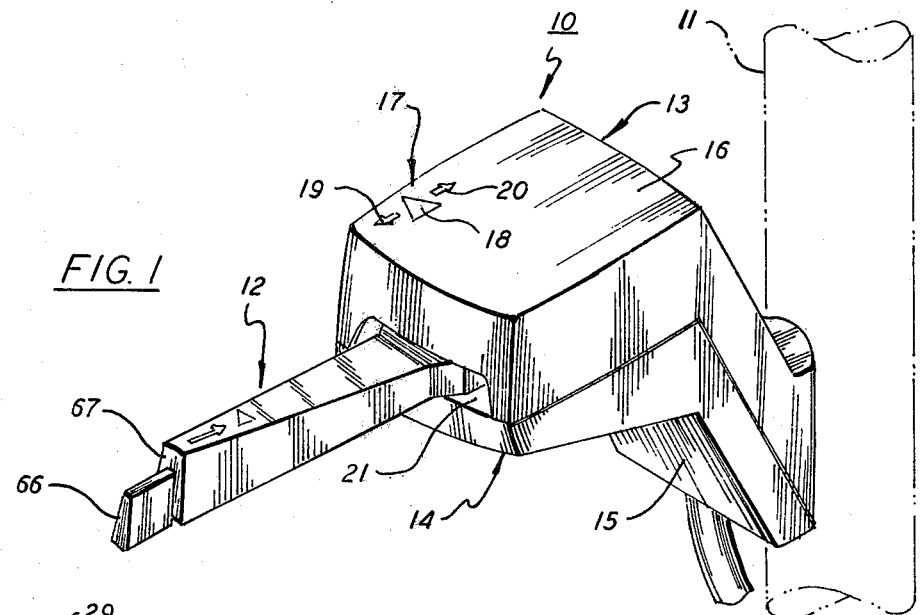
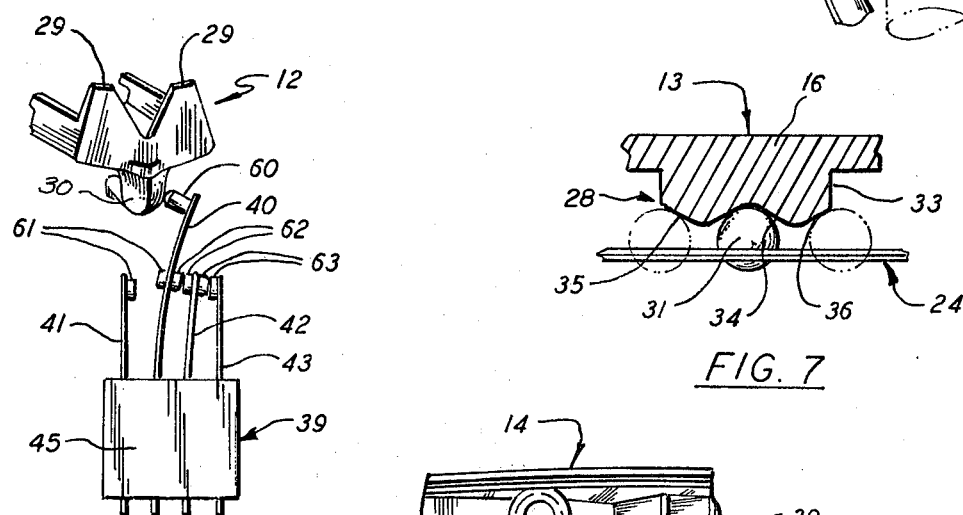
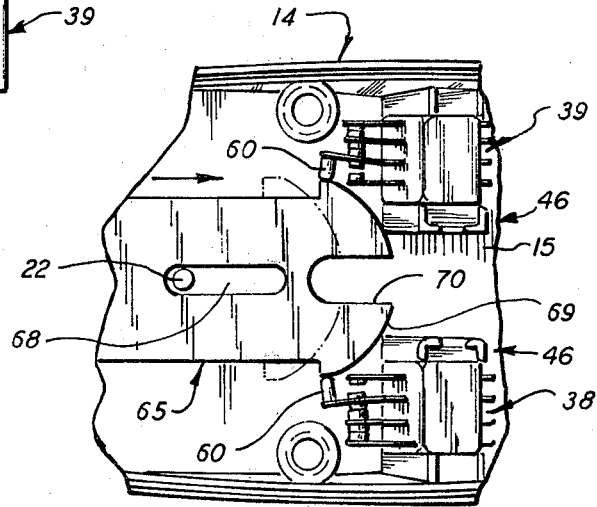

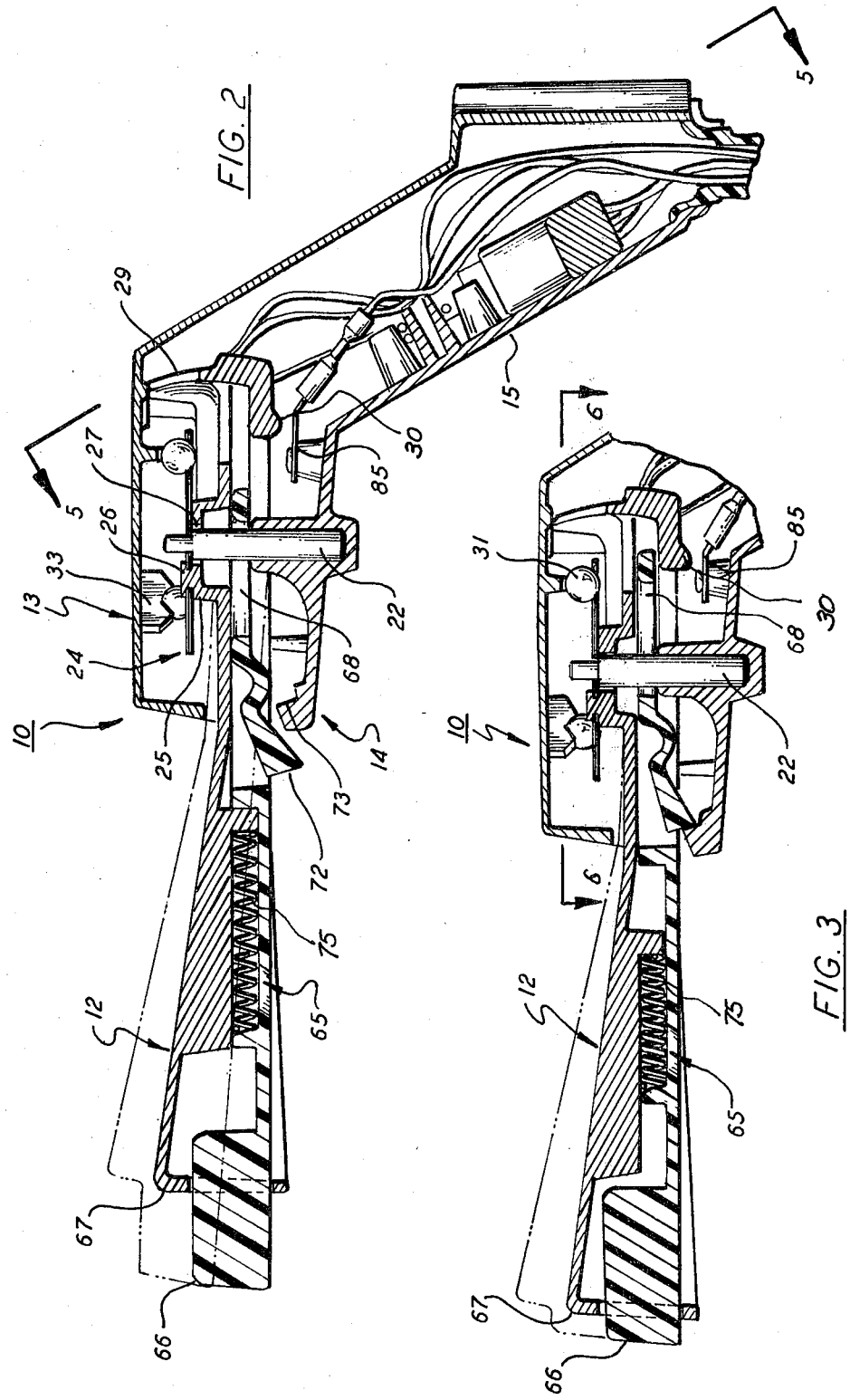

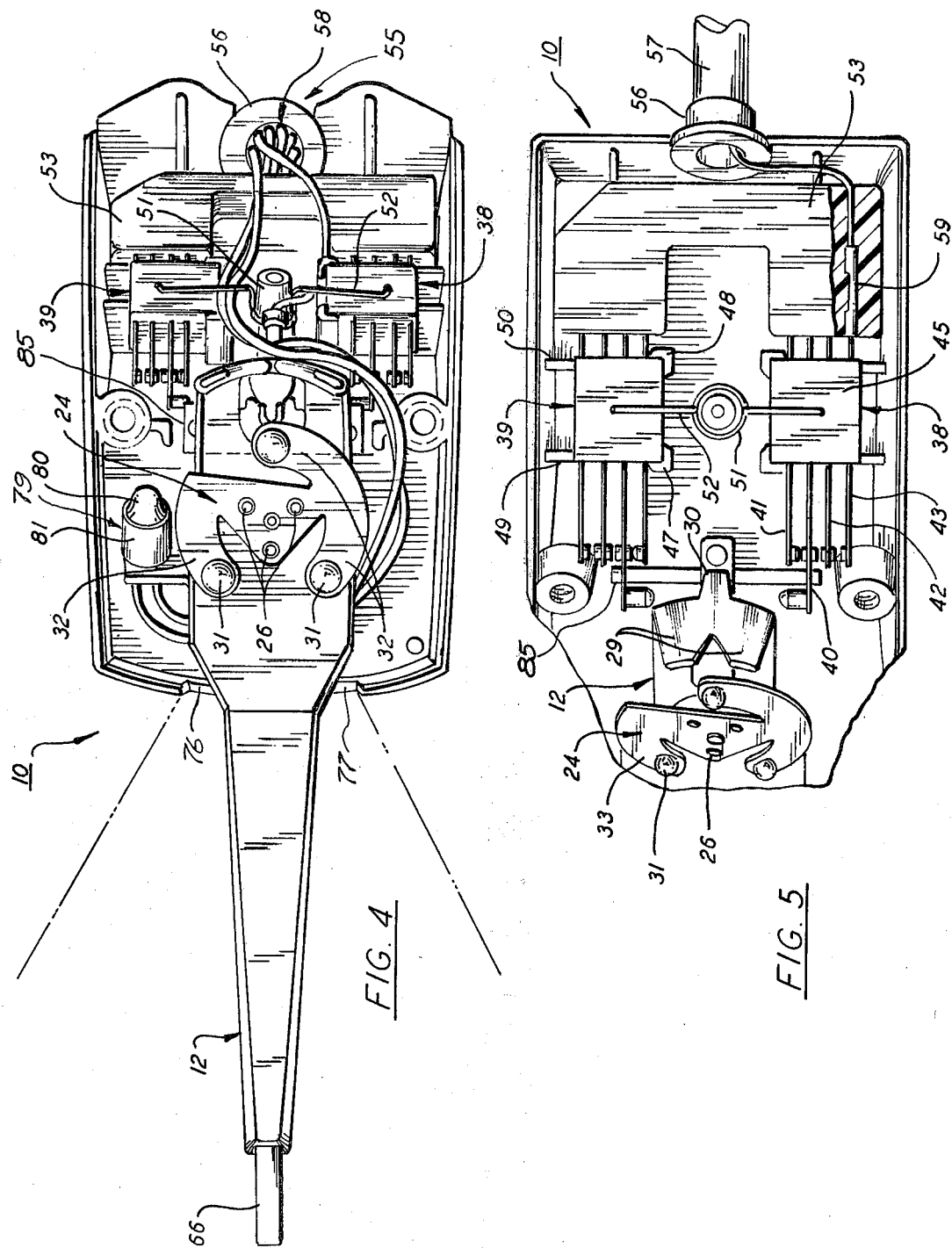

SIGNAL SWITCH ASSEMBLY

BACKGROUND OF THE INVENTION

This invention relates to a multifunction signal switch suitable for use in a motor vehicle and, in particular, to a self-contained signal switch which is both rugged in construction and easy to maintain.

As exemplified by U.S. Pat. No. 3,858,176, multifunction switches such as turn signals and hazard warning devices are typically housed within the steering column of the vehicle. The size of the switch components is thus restricted and, as a consequence, the switch assemblies are susceptible to breakage when subjected to prolonged strenuous usage. The in-column switch assembly has therefore not found wide acceptance in heavy duty equipment. Similarly, it is difficult to perform maintenance upon a signal switch assembly that is built into the steering column because of the limited amount of space available in which to work. Normally, when such maintenance is required, the vehicle must be taken out of service for a period of time which, in the case of a heavy duty truck, can be costly.

To overcome some of the difficulties associated with the in-column signal switches, many heavy duty vehicle users have turned to the stronger and generally more reliable "hang on" or self-contained assemblies which can be clamped to the outside of the steering post. Although more accessible, these devices are still difficult to maintain because the electrical components, and particularly the switch contacts, are generally hard wired into the circuitry. Accordingly, changing contacts, which become worn with usage, require special maintenance that usually necessitates removal of the vehicle from service.

Most signal switch assemblies, whether self-contained or otherwise, only offer two modes of operation; a turn signal mode and a hazard warning mode. As a result, full advantage of the conveniently located signal switch is not truly realized.

SUMMARY OF THE INVENTION

It is therefore an object of the present invention to improve self-contained signal switches to provide for more reliable heavy duty service.

A further object of the present invention is to provide a rugged, easy to maintain, signal switch capable of delivering more than two functional modes of operation.

Another object of the present invention is to provide an automotive signal switch utilizing modular contacts that may be easily replaced in assembly.

These and other objects of the present invention are attained by means of a self-contained signal switch assembly that is adapted to be secured to the steering post of a motor vehicle and which includes a single actuator arm that is selectively positionable to provide three individual switching functions including a turn signal function, a hazard warning function and an optional function that can be selected by the user. Flexible blade contacts are utilized in the assembly that are packaged in modular units which can be easily replaced as required in assembly. The electrical system of the present device is further provided with a two lead pilot light that is compatible with either a two or three terminal flasher unit.

BRIEF DESCRIPTION OF THE DRAWINGS

For a better understanding of the present invention as well as other objects and further features thereof, reference is had to the following detailed description of the invention to be read in conjunction with the accompanying drawings, wherein:

FIG. 1 is a perspective view of a signal switch apparatus embodying the teachings of the present invention showing the apparatus secured to the outside of the steering column of a motor vehicle;

FIG. 2 is an enlarged side elevation in section of the present signal switch assembly better illustrating component parts thereof;

FIG. 3 is a partial side elevation of the sectional view of FIG. 2 showing the actuating arm in a hazard warning mode of operation;

FIG. 4 is an enlarged plan view of the signal switch apparatus shown in FIG. 2 with the top cover removed;

FIG. 5 is a partial sectional view taken along lines 5—5 in FIG. 2 illustrating in greater detail the modular arrangement of the electrical contacts contained therein;

FIG. 6 is a partial view taken along lines 6—6 in FIG. 3 having parts omitted to more clearly show the contacts positioned in a hazard warning condition;

FIG. 7 is a breakaway sectional view showing the ball and detent arrangement for holding the lever arm of the apparatus in a number of manually selected functional positions;

FIG. 8 is a partial view of one of the contact modules being actuated by the actuating arm of the instant assembly.

DESCRIPTION OF THE PREFERRED EMBODIMENT

Figure 9:
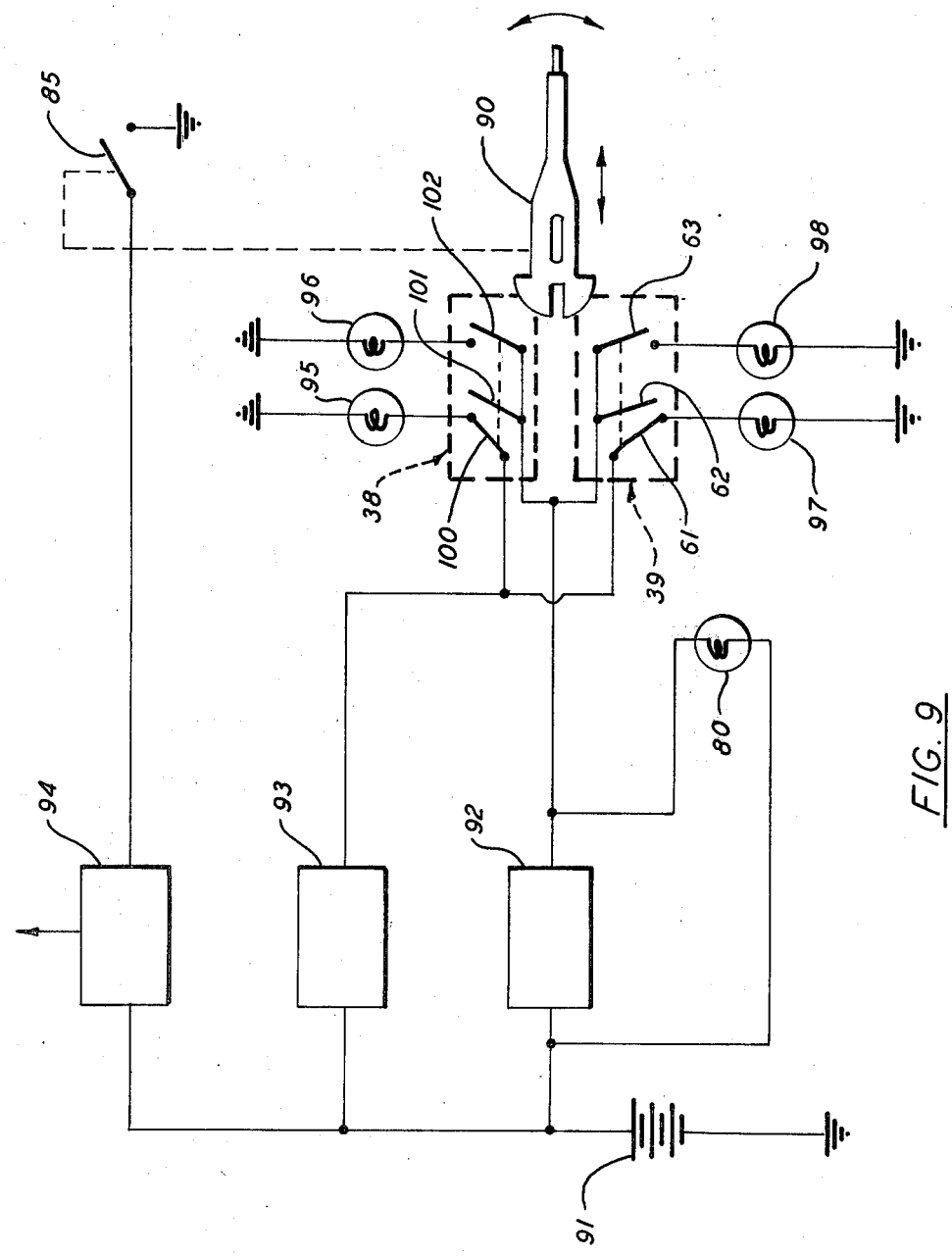
FIG. 9 is an electrical diagram setting out in schematic representation the electrical components of the present invention.

Referring initially to FIG. 1 there is illustrated a heavy duty signal switch assembly 10 suitable for use in large trucks and other heavy duty vehicles normally requiring this type of rugged mechanism. The present signal switch is a "hang-on" installation which typically engages the steering column 11 of the vehicle by means of a clamp or the like (not shown) to support the assembly in a position wherein the operator of the vehicle can conveniently manipulate the actuating arm 12 without adversely affecting his control of the vehicle. The signal switch assembly is contained within a housing 13 that includes a base 14, having an inclined section 15, and a removable cover 16 situated over the base. A transparent lens assembly 17, made up of a central window 18 and two indicating arrows 19,20, is located in the top surface of the cover to provide a visual indication of the mode of operation selected by the operator.

The arm 12 passes out of the housing through means of an opening 21 that is provided in one side wall thereof. As best seen in FIGS. 2-5, the arm 12 is rotatably supported within the housing upon a pivot 22 staked into the base 14. A flat spring 24 of generally circular form is secured to a flange 25 carried upon the top surface of the arm 12 by any suitable means, as for example rivets 26. The spring 24 is provided with a hole 68 centrally formed therein having a close running fit with the undercut end of the pivot 22. In assembly, the flat spring is passed over the end of the pivot and is seated against the undercut shoulder to support the arm in a generally horizontal position. A clearance hole 27 is formed in the flange 25 of the arm through which the main body of the pivot passes. Sufficient clearance between the pivot and the arm is supplied so that the arm can be deflected in a generally vertical plane upon the flat spring while at the same time allowing the arm to be rotated in a horizontal direction. A pair of stops 29 extend upwardly from the top surface of the arm and are adapted, in assembly, to cooperate with the inner top wall of the housing cover to limit the vertical movement of the arm. Vertical deflection of the arm in a counterclockwise direction will cause the stops to contact the top wall of the cover and prevent further movement of the arm. As a result, the arm may only be deflected vertically in a clockwise direction as depicted by the phantom outline of the arm illustrated in FIGS. 2 and 3.

A detent mechanism, generally referenced 28, is also provided in conjunction with the arm to regulate horizontal positioning of the arm in assembly. The detent mechanism is made up of a plurality of balls 31, which are seated in openings formed in arcuate shaped sections 32 of the flat spring, and which cooperate with detent elements 33 depending downwardly from the top wall of cover 16. As best seen in FIG. 7, elements 33 contain a central detent notch 34 and two notch segments 35 and 36 respectively on either side thereof. The resilient flat spring and ball arrangement allows the arm to be horizontally repositioned between the three detent positions while at the same time supplying a sufficient biasing force to hold the arm in a selected position under heavy duty operating conditions. By the same token, this arrangement also permits the arm to be deflected in a vertical direction regardless of the detent position selected.

Referring now more specifically to FIGS. 4 and 5, there is illustrated two modular contact units 38 and 39 which serve to control the initiation of both the turn signal functions and the hazard warning function which will be explained in greater detail below. Each module contains a set of four flexible blades that includes one longer control blade 40 and three shorter follower blades 41-43. The central or body portion of the blades which make up the individual sets is supported within a rectangular spacer block 45 cast from an insulating material, such as a glass filled polyester, and which functions to maintain the blades in spaced parallel alignment in assembly. As shown, electrical contacts are supported at the free end of each blade which can be actuated, as will be explained below, to initiate or terminate certain electrical lighting functions.

The rectangular form of each spacer block is adapted to be seated within a holding frame 46 (FIG. 7) cast into the inner wall of the inclined section 15 of base 14. Each frame consists of two raised corner tabs 47,48 (FIG. 5) and two raised end tabs 49,50 which cooperate to receive the spacer block of a module therebetween and prevent the module from moving laterally in the housing. A spring loaded wire retainer 52 is rotatably supported upon post 51 situated between the two holding frames and the wire retainer is adapted to pass over the back of the spacer block of each module, as illustrated in FIGS. 4 and 5, to keep the units from moving out of the frame in assembly.

The terminal end of each blade in the module, that is, the end opposite the contact supporting end, is insertably receivable within plug in type socket assembly 53. The socket assembly forms part of an electrical harness, generally referenced 55, which includes a grommet 56, positioned within an opening provided in the lower part of the housing, and an insulating sleeve 57 through which passes a wire bundle 58 containing the electrical leads of the various related circuits. In practice, the sleeve is brought down the steering column of the vehicle and carried under the dashboard where the wires are electrically connected into the appropriate automotive circuits. The switch end of the leads are cast into the socket assembly as shown in FIG. 5. Each lead terminates at the socket face with a snap-in type receptacle 59 adapted to slidably receive the terminal ends of the contact blades therein and thus securely support the module units in place in assembly. To provide for interchangeability, equal spacing is maintained between the blades so that a single module can be used to service each contact set.

As can be seen, in the event one set of contacts needs replacing, the base is simply removed from the cover 16, which remains mounted upon the steering column, and the defective module unplugged from the socket assembly and a new module slipped into its place. Normally, the changeover can be accomplished by the operator of the vehicle in a matter of minutes using simple tools. As a consequence, a change of defective contacts can be made quickly while the vehicle is in use thereby avoiding the need of taking the vehicle out of operation.

The contact module 38 on the left-hand side of the housing, as viewed in FIG. 5, controls the operation of the front and rear warning lights on the right side of the vehicle while the contact module 39 controls the operation of the front and rear warning lights on the left-hand side. To initiate a right-hand turn signal, the arm is rotated in a horizontal plane about the pivot in a clockwise direction. This causes the detent balls to be moved out of the central detent notch and into notch segment 36. At the same time, a downwardly depending lug 30 supported upon the arm actively engages the contacts associated with contact module 38 to activate the lamps on the right-hand side of the vehicle. Rotating the arm in a counterclockwise direction, of course, will bring the lug into engagement with the contacts of module 39 and thus actuate the lamps on the left-hand side of the vehicle to generate a left-hand turn signal.

Referring to FIG. 8, there is shown a partial view of the arm positioned to signal a left-hand turn. As shown, the activating lug 30 engages a follower 60 supported on the longer or extended blade 40 of module 39 to deflect the blade back and thus open normally closed contact 61 and close the two normally opened contacts 62,63 which, as will be explained below, causes the warning lamps on the left-hand side of the vehicle to be flashed on and off. The detent mechanism noted above serves to hold the arm in the left turn operative position until such time as the operator manually returns the arm to its neutral position. This latter non-cancelling feature is desirable in many larger type vehicles having a relatively wide turning radius wherein the truck must swing wide in one direction before a turn in the opposite direction can be completed. This maneuver would normally cancel a conventional self-cancelling mechanism halfway through the turn and thus force the operator to reinitiate the turn signal while he is attempting to complete the turn.

Referring once again specifically to FIGS. 2 and 3, a slide, generally referenced 65, is slidably mounted within the actuator arm and is arranged to move back and forth over a reciprocal path of travel parallel with the central axis of the arm. The slide includes an outwardly depending pushbutton 66 at the left-hand end thereof as viewed in FIG. 2 that is adapted to pass through the unsupported end wall 67 of the arm and extend outwardly therefrom some distance to allow the operator of the vehicle to push the slide inwardly toward the housing. Preferably, the slide is fabricated of a resilient plastic material having a low coefficient of friction whereby the slide moves freely within the arm. The pivot 22, which supports the arm, passes upwardly through an elongated, axially aligned, opening 68 (FIG. 2) formed in the slide and also serves as a stop to govern the degree of lateral movement provided for the slide. A semicircular camming surface 69, which is formed on the right-hand end of the slide, is contoured so that its working face simultaneously engages both followers 60 on contact modules 38,39 to deflect the blades sufficiently to actuate the warning lamps on both sides of the vehicle when the slide is moved to a fully extended inward position as shown in FIG. 6. As will be explained below, this gang loading of the module contacts generates a flashing hazard warning signal. A slotted groove 70, centrally located in the camming surface, provides clearance for the downwardly extending actuating lug 30 affixed to arm 12.

A locking mechanism is operatively associated with the slide to hold the slide in the extended or hazard warning position when button 68 is pushed to a full in position. The holding mechanism includes a latch 72, depending downwardly from the slide, and a receiving notch 73 formed in the side wall of the housing. The latch normally extends downwardly beyond the level of the wall whereby the latch is forced upwardly as the slide is pushed toward the housing warning position. The latch is formed of the same resilient material as the slide and is therefore able to deform sufficiently to clear the wall. Upon clearing the wall, the latch immediately drops into the notch as shown in FIG. 3 to hold the camming surface in actuating contact against the contacts of the two modular units thus generating a continuous hazard warning signal.

A compression spring 75 is mounted horizontally within arm 12 and acts between the arm and the sleeve to urge the sleeve towards a home or non-actuating position. Two recesses 76,77 (FIG. 4) are formed in the side wall of the housing on either side of the latch receiving notch. The recesses are brought to a depth which will permit the latch to move out of the locked hazard warning position, under the urging of the compression spring, when the arm is rotated horizontally about the pivot to either side of its neutral position.

A pilot light 79 is mounted on the side of the arm as illustrated in FIG. 4. The light includes a lamp 80 and a shield 81 which are secured to the side wall of the arm to position the light directly below the indicator window lens 18, in the top cover of the housing, when the arm is in a neutral position. The location of the pilot light is offset in reference to the pivot of the arm such that the pilot light illuminates the appropriate arrow 19 or 20 when the lever arm is moved to a right or left-hand turn operative position. Electrical wiring to the lamp is brought into the housing via the harness as shown in FIG. 4.

The signal switch assembly of the present invention is also equipped with an additional switching function which can be wired into any one of a wide variety of automotive related electrical circuits at the option of the user. These circuits can include, but are in no way limited to, a horn actuating circuit, running light circuits or a headlight dimmer circuit. In the present apparatus, the arm is formed of a conductive material and is electrically grounded in assembly. An elongated switch contact 85 is positioned beneath the actuating lug 30 of the lever arm and, by means of the flat spring and detent arrangement as described above, the grounded lug is able to make the contact when the arm is deflected in a vertical direction. The lateral width of the contact is such as to permit the circuit to be closed regardless of the horizontal position of the arm. As a result, the operator is able to select the optional switch function when the arm is in a neutral position, an operative position or when the slide is extended inwardly. Again, the electrical wiring associated with the contact is carried out of the housing via the wiring harness as shown in FIG. 4.

Turning now to FIG. 9, there is shown an electrical diagram which will be used to describe the operational features of the present invention. In this diagram, the arm and slide are schematically represented as element 90 which can be activated in the manner described above to open and close the contacts of modules 38,39. Power to the electrical system is provided by the main automotive system which, for explanatory purposes, is depicted as a battery 91. As shown, the positive side of the battery is connected in series with a flasher circuit 92, brake switch 93 and relay circuit 94. The right rear warning lamps and right front warning lamps are represented by lights 95 and 96, respectively, while those on the left rear and front are represented by lights 97 and 98. The lamps, in this arrangement, are electrically grounded.

As is conventional, the brake switch is adapted to be closed by the operator depressing the brake pedal of the vehicle. Releasing the pedal causes the switch to be opened. The brake switch is electrically connected to normally closed contacts 61 and 100 contained in modules 39 and 38 so that the two rear warning lamps 95 and 97 are normally illuminated any time the brake pedal is depressed.

Flasher circuit 92 can be of any suitable construction and typically includes a transistorized switching network adapted to periodically open and close a control circuit at a predetermined rate to flash the warning lights on and off. The flasher circuit is electrically connected to the two normally opened contacts in both modular units which are represented as contacts 62 and 63 in module 39 and contacts 101 and 102 in module 38. As explained above, the arm, upon being manually rotated to an operative position on either side of its neutral position, opens the brake light contact of the engaged module and closes the flasher associated contacts thereby overriding the brake light function and generating a flashing turn signal on the appropriate side of the vehicle.

Pressing the button on the slide inwardly causes both modular contact units to be actuated simultaneously by the working face of the cam. This results in both brake light contacts 61,100 being opened and the four flasher contacts 62,63 and 101,102 to be closed thus generating a hazard warning signal wherein all warning lamps on both sides of the vehicle are brought into a periodic on-off function.

As further illustrated in FIG. 9, pilot light 80 is electrically shunted over the flasher control circuit 92. When the turn signal contacts are closed, a complete circuit from the battery to ground is provided through the flasher circuit, the pilot light and the closed contacts. Closing the flasher circuit puts a voltage on both sides of the pilot light causing the light to go off. Upon opening of the flasher circuit, most of the battery voltage is dropped over the pilot light thus turning the light on. Although the warning lights provide a path to ground for the pilot, they nevertheless remain unlit during the period that the pilot is illuminated because of the difference in resistance between the pilot bulb and the parallel wired warning lamps. As can be seen, this arrangement minimizes the amount of components required while still providing a system that is compatible with most two and three terminal flasher circuits.

Regardless of which position arm 12 is in, the arm can be deflected in a vertical plane to make the relay contact 85. This provides a path to ground for relay 94 causing the relay to become energized. In practice, the relay can be electrically connected into any one of a number of useful circuits at the option of the operator. As noted, these circuits can include, but are not limited, to a headlight dimming circuit, cab roof marker lights, side marker lights, fog lights, a horn actuator or the like.

As can be seen from the present disclosure, the apparatus of the present invention provides a rugged switch assembly that can be conveniently attached to the steering column of any type of motor vehicle to enable the operator to select a number of functions at his option. It should be further noted that the present device can be wired directly into any conventional flasher system using either a two or three terminal arrangement and can be easily assembled and disassembled for maintenance without having to dismantle the steering column of the vehicle. By utilizing plug in modular contact units, the down time involved for maintenance is further reduced thus affording the user substantial savings in time and money.

While this invention has been disclosed with reference to the details as set forth above, it is not confined to the details contained herein, and this application is intended to cover any modifications or changes as may come within the scope of the following claims.

I claim:

1. A signal switch for use in a motor vehicle including a housing that is adapted to be secured to said vehicle, first and second electrical contact units contained within said housing, said first unit being arranged when actuated to electrically connect front and rear lamps mounted on the right side of the vehicle to circuit means for illuminating said right side lamps and said second unit being arranged when actuated to electrically connect front and rear lamps on the left side of the vehicle to said circuit means for illuminating said left side lamps, a movable arm affixed to a flat spring, said spring being rotatably supported within said housing upon a pivot pin so that said arm is rotatable about said pivot within a first plane of rotation and independently deflectable upon said spring within a second plane that is substantially perpendicular with said first plane of rotation regardless of the rotational position of said arm, said arm extending outwardly from said housing through an opening formed in a sidewall thereof and having an actuator means associated therewith that is normally located in a neutral position between said two contact units and being arranged to actuate said contacts of said first unit when said arm is rotated in one direction to a first operative position and to actuate said contacts of said second unit when said arm is rotated in the opposite direction to a second operative position, a slide slidably mounted within said arm and being arranged to move inwardly toward said housing from a home position to an extended position, said slide having camming means operatively associated therewith for simultaneously actuating said contacts of both of said units when said slide is in an extended position and for releasing said contacts when said slide is in the home position, and switch means supported adjacent to said arm within said housing, said switch means being actuated by said arm when said arm is deflected upon said spring in a plane generally perpendicular to said plane of rotation of said arm.

2. The assembly of claim 1 further including a latch means depending outwardly from said slide to engage a stationary element on said housing when said slide is moved within said neutrally positioned arm to an extended position and to clear said element when said arm is rotated to either side of the neutral position thereby allowing said slide to return to the home position.

3. The assembly of claim 2 further including biasing means acting between said housing and said slide for urging said slide into the home position.

4. The assembly of claim 3 wherein said slide protrudes outwardly beyond the extended end of said arm.

5. The assembly of claim 4 further including a detent mechanism acting upon said spring for resiliently supporting said arm in any one of said operable positions while simultaneously therewith allowing said arm to be deflected upon said spring.

6. The assembly of claim 5 further including a plurality of balls rotatably supported within the outer extremities of said spring, each of said balls being arranged to be seated within a detent notch formed in said housing when said arm is in said neutral position or said first and second operative positions.

7. The assembly of claim 1 wherein each contact unit includes a plurality of flexible contact blades contained within a support to form a plug in module and socket means within said housing for insertably receiving said modules.

8. The assembly of claim 1 further including a flasher unit electrically connected to each of said contact units for flashing said associated front and rear lamps on and off when said contacts of each contact unit are selectively actuated.

9. The assembly of claim 8 wherein each contact unit contains a normally closed contact for electrically connecting said rear lamps of the vehicle to a brake switch on said vehicle, said normally closed contacts being opened when said flasher unit is actuated.

10. In a self-contained signal generating assembly for use in a motor vehicle, the assembly having an elongated actuating arm that is rotatably supported within a housing to actuate electrical circuit means contained within the housing for lighting front and rear signal lamps in a prescribed order in response to the positioning of said arm, the improvement comprising a flat spring affixed to said arm, said spring being rotatably mounted upon a pivot secured within said housing to enable said arm to be rotated in a plane about said pivot whereby said arm can be moved in said plane between a plurality of operating positions, and wherein said arm is deflectable upon said spring within a plane that is generally perpendicular to the plane of rotation, and a function switch positioned adjacent to said arm having a contact that is closable by said arm when said arm is deflected regardless of the position of said arm in said plane of rotation.

11. The assembly of claim 10 that further includes a detent mechanism acting between the flat spring and said housing for resiliently supporting said arm in each of said operative positions while simultaneously allowing said arm to be deflected upon said spring.

12. The assembly of claim 10 that further includes a slide slidably mounted within said arm for movement between a home position and an extended position, a camming surface affixed to said arm for actuating said circuit means when said slide is placed in an extended position, and a biasing means acting between said arm and said slide for urging said slide into said home position.

13. The assembly of claim 12 that further includes a latch means depending outwardly from said slide and arranged to engage a stationary element on said housing when said slide is moved to said extended position to hold said slide in said extended position.

* * * * *